United States Patent [19]

Arene et al.

[11] Patent Number: 4,657,071
[45] Date of Patent: Apr. 14, 1987

[54] HEAT EXCHANGER INCORPORATING AN AUXILIARY COOLING DEVICE

[75] Inventors: Gilbert Arene, Pertuis; Robert Artaud, Aix en Provence; Charley Renaux, Jouques, all of France

[73] Assignee: Commissariat a l'Energie Atomique, France

[21] Appl. No.: 625,122

[22] Filed: Jun. 27, 1984

[30] Foreign Application Priority Data

Jul. 1, 1983 [FR] France ................ 83 10993

[51] Int. Cl.4 .............................................. F28F 9/22
[52] U.S. Cl. ................................ 165/134.1; 165/141; 165/160
[58] Field of Search ............... 165/160, 161, 144, 145, 165/140, 134 R, 108, 129, 141, 134.1

[56] References Cited

U.S. PATENT DOCUMENTS

| 4,193,447 | 3/1980 | Fah | 165/140 X |
| 4,235,284 | 11/1980 | Coleman | 165/141 |
| 4,258,781 | 3/1981 | Dörling et al. | 165/140 X |
| 4,285,393 | 8/1981 | Maus et al. | 165/160 X |
| 4,286,366 | 9/1981 | Vinyard | 165/162 X |
| 4,418,748 | 12/1983 | Pouderoux et al. | 165/160 X |
| 4,423,770 | 1/1984 | Pouderoux et al. | 165/134 R |

FOREIGN PATENT DOCUMENTS

| 1064036 | 8/1959 | Fed. Rep. of Germany | 165/108 |
| 1111553 | 3/1956 | France | 165/140 |
| 74961 | 12/1961 | France | 165/108 |
| 2183092 | 12/1973 | France | 165/160 |

Primary Examiner—Sheldon J. Richter
Attorney, Agent, or Firm—Cesari and McKenna

[57] ABSTRACT

A heat exchanger of the type incorporating an auxiliary cooling device includes an envelope with inlet and outlet windows for conducting a primary heat transfer medium through the envelope. A bundle of heat exchange tubes is mounted in the envelope with corresponding first ends of those tubes being located adjacent to the inlet window and corresponding second ends of the tubes being located adjacent to the outlet window. First and second collectors are in fluid communication with the tube ends for conducting a second heat transfer medium through the tubes. The auxiliary cooling device is positioned in the inlet window and surrounds the tube first ends and a ferrule projecting upwards from the envelope from the inlet window therein surrounds the cooling device to direct the primary heat transfer medium through the cooling device and into the inlet window of the envelope.

8 Claims, 9 Drawing Figures

HEAT EXCHANGER INCORPORATING AN AUXILIARY COOLING DEVICE

The present invention relates to a heat exchanger comprising a vertical envelope, heat transfer tubes installed in said envelopes, inlet and outlet windows for carrying a primary heat transfer medium circulating between said tubes and inlet and outlet collectors for carrying a secondary heat transfer medium within said tubes. The exchanger has an auxiliary cooling device surrounding the heat transfer tubes for cooling the primary heat transfer medium when it is not being forcibly circulated, which gives rise to natural downwards circulation of the primary heat transfer medium.

For example, such a heat exchanger is used for extracting on the one hand the heat produced by a nuclear reactor core in normal operation, and on the other hand the residual power during a stoppage accident of the reactor pumps.

Existing nuclear reactors use heat exchangers not having an integrated auxiliary cooling device. Certain fast neutron nuclear reactors, e.g. the Super Phénix reactor, are provided with devices for cooling the reactor when shut down and which are separate from the heat exchangers. These devices have the double disadvantage of requiring supplementary passages in the reactor slab and of not being located in the natural convection circuit passing through the reactor core and consequently, they have an inadequate efficiency level.

However, French Pat. No. 2,374,609 describes a heat exchanger containing an integrated auxiliary cooling system. In this exchanger, the auxiliary cooling winding is not located in the primary sodium circuit and is instead positioned in a cavity surrounding the bundle of exchanger tubes. It is consequently branched from the primary sodium circuit. As its natural convection efficiency is limited by the branching effect, the efficiency level is relatively low.

SUMMARY OF THE INVENTION

The object of the invention is to obviate this disadvantage, which is brought about by providing a heat exchanger having an auxiliary cooling device, which has an improved efficiency in natural convection.

According to the invention, this result is obtained by the fact that the auxiliary cooling device is located in the inlet window of the exchanger and that a ferrule, called the protective ferrule, surrounds the auxiliary cooling device, said ferrule being open in its upper part and connected in its lower part to the exchanger envelope.

The advantages obtained as a result of the invention are essentially based on the fact that the starting of primary sodium circulation by natural convection is facilitated. The sodium cooled on the exchange bundles of the auxiliary cooling device drops into the exchanger. It can only descend towards the cold collector and then rises towards the reactor core, wherein it is reheated whilst discharging the residual power. Thus, the auxiliary cooling device has a maximum efficiency for removing the residual power from the shutdown reactor.

BRIEF DESCRIPTION OF THE DRAWINGS

The invention is described in greater detail hereinafter relative to non-limitative embodiments and with reference to the drawings, wherein show:

FIG. 2b a plan view in section of the exchanger of FIG. 2a.

DETAILED DESCRIPTION OF THE PREFERRED EMBODIMENTS

Figure 1:
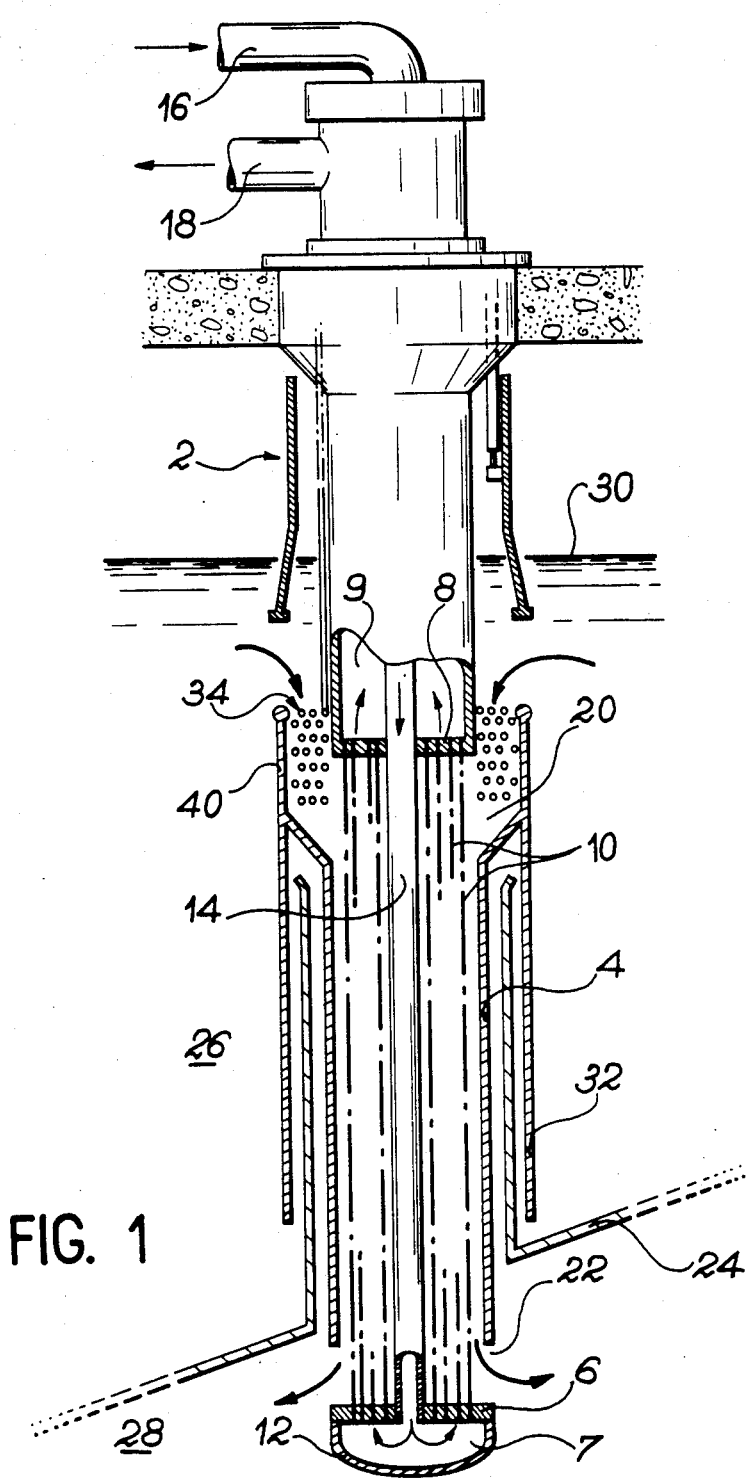
FIG. 1 a general view, partly in section, of a heatexchanger according to the invention.

The heat exchanger according to the invention shown in FIG. 1 comprises an auxiliary cooling device located in the primary sodium circuit permitting an optimum removal of the residual power of the core when the reactor is shut down. Exchanger 2 comprises an outer envelope 4 carrying the primary heat transfer fluid, a lower tube plate and an upper tube plate 8. Between plate 6 and plate 8 extends a bundle of linear tubes 10, fixed at each of their ends in plates 6 and 8. In its lower part, exchanger 2 has a base 12 defining with tube plate 6 an inlet collector 7 for a secondary heat transfer fluid. Above tube plate 8 there is an outlet collector 9 for the same heat transfer fluid.

Furthermore, tube plates 6 and 8 are centrally perforated to permit the passage of a central tube 14 connected to a pipe 16. The outlet collector is connected to a pipe 18.

Envelope 4 has an inlet window 20 in the vicinity of tube plate 8. It also has an outlet window 22 positioned above tube plate 6.

According to the invention, exchanger 2 has an auxiliary cooling device 34 located in the inlet window around the secondary heat transfer fluid outlet collector 9 and/or the upper part of the tube bundle 10.

Figure 2A:
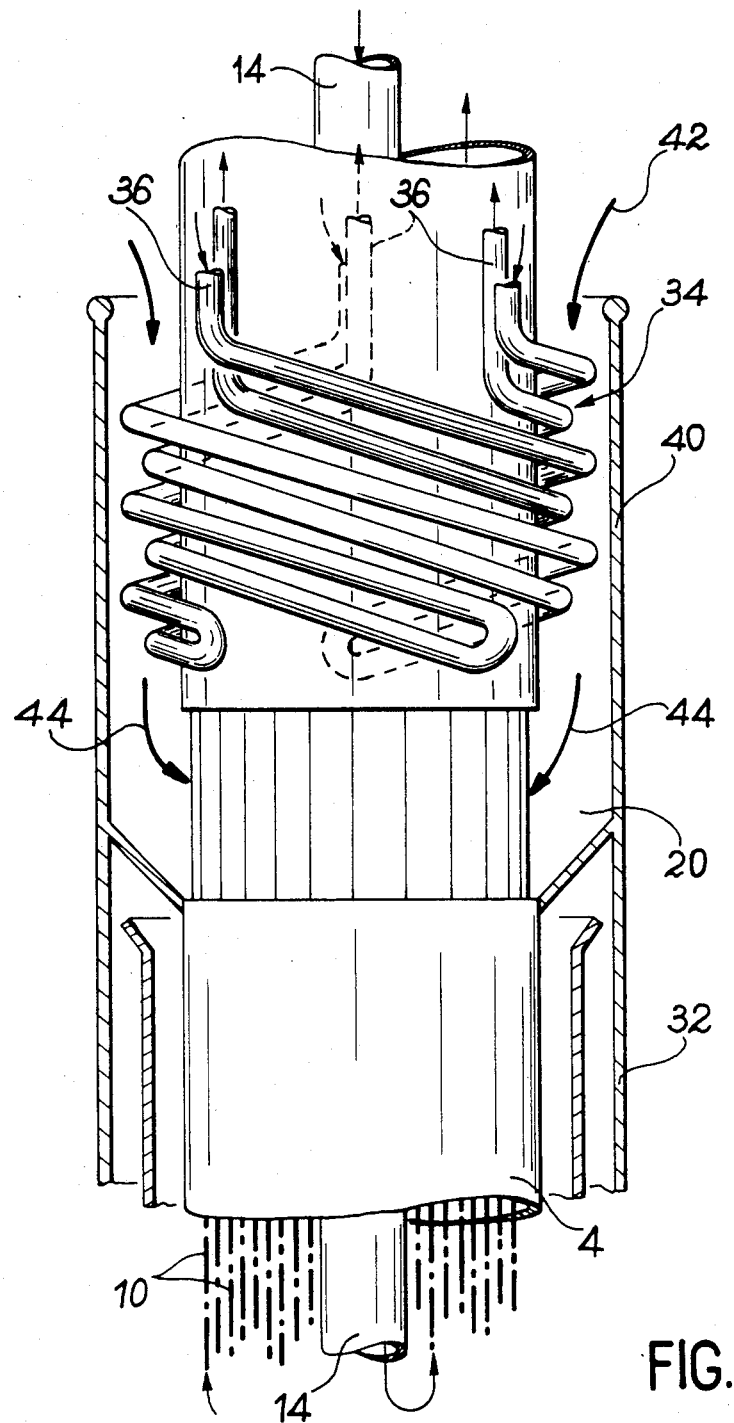
FIG. 2a a partial view in section of the heat exchanger of FIG. 1.

Moreover, the device has a ferrule 40, called the protective ferrule, which surrounds window 20 and device 34. The function of the protective ferrule is to carry the sodium circulating around device 34 in the direction of arrows 42 and 44 towards window 20 and as shown in FIG. 2a. The efficiency of device 34 would be reduced without the protective ferrule.

Figure 2B:
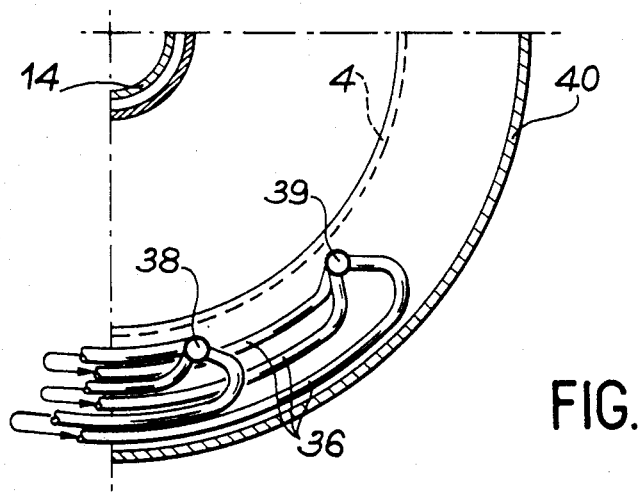

FIG. 2b is a plan view of the exchanger of FIG. 2a showing the collecting system of the exchange pipes of device 34.

Figure 3:
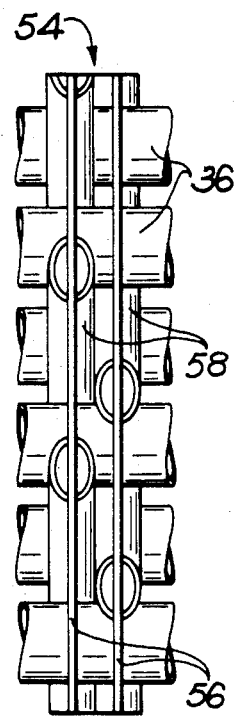
FIGS. 3 and 4 respectively a longitudinal sectional view and a plan view of the anti-vibration belt.
Figure 4:
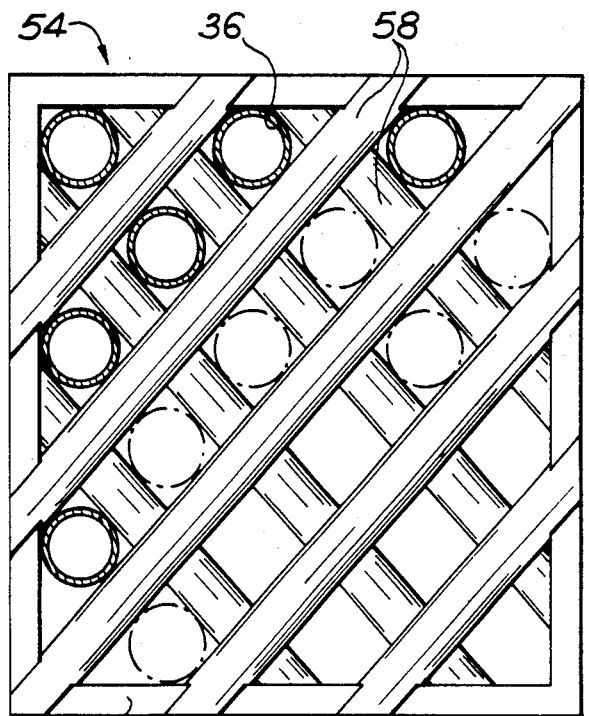

FIGS. 3 and 4 show a construction of the anti-vibration belt 54 constituted by a rigid frame 56 and by a double system of crossed bars, which trap the tubes 36 of the auxiliary cooling device. The anti-vibration belt 54 absorbs the vibration of the hairpin-shaped tubes, but does not oppose the expansion thereof.

Figure 5:
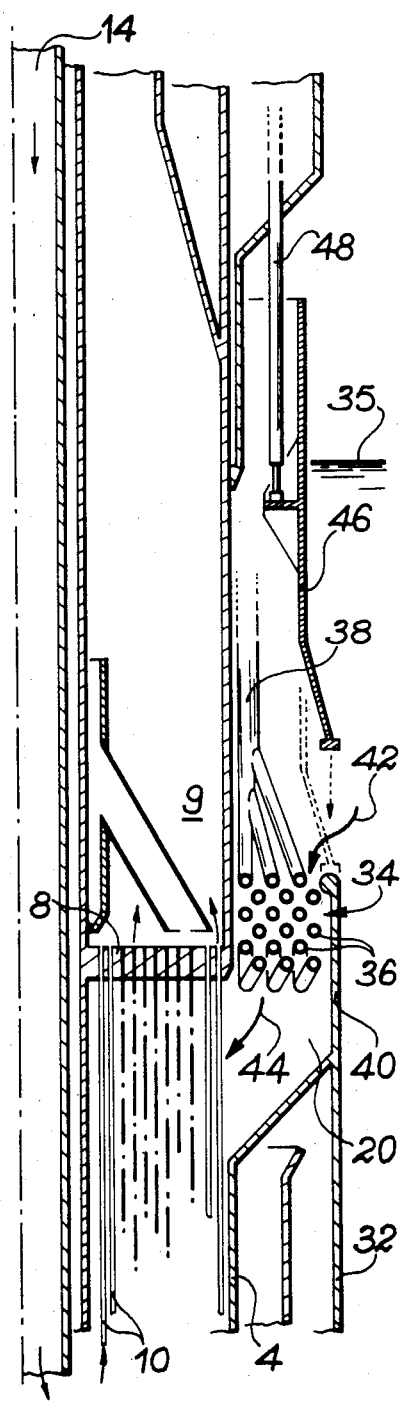
FIGS. 5 to 8 constructional variants of the exchanger.

FIG. 5 shows a first construction of the heat exchanger according to the invention in which the auxiliary cooling device 34 is essentially positioned level with the outlet collector 9 of the secondary heat transfer fluid. During the normal operation of the reactor, the complete sodium flow passes on the group of tubes of the auxiliary cooling device. Thus, it is in this constructional variant that there is a maximum effectiveness of removing the residual power, but the pressure drop is also at a maximum level. However, this is not a serious disadvantage, because this supplementary pressure drop is relatively small. It can be easily compensated by adding one or two rings of tubes 10 to the exchanger tube bundle. Moreover, the tube bundle of the auxiliary cooling device 34 has an identical function to the baffles conventionally used for rendering uniform the sodium flow in the intermediate exchanger. It can also serve as a mixer for the sodium when it enters the exchanger, when stratifications form in the hot collector, as is the case when the reactor operates with a partial primary flow.

FIG. 5 also shows a sealing device 46 displaced by a system of linkages 48. This device makes it possible to seal one or possibly several heat exchangers during the partial operation of the nuclear boiler. The auxiliary cooling device 34 is compartible with the sealing system of the exchanger inlet window 20.

Figure 6:
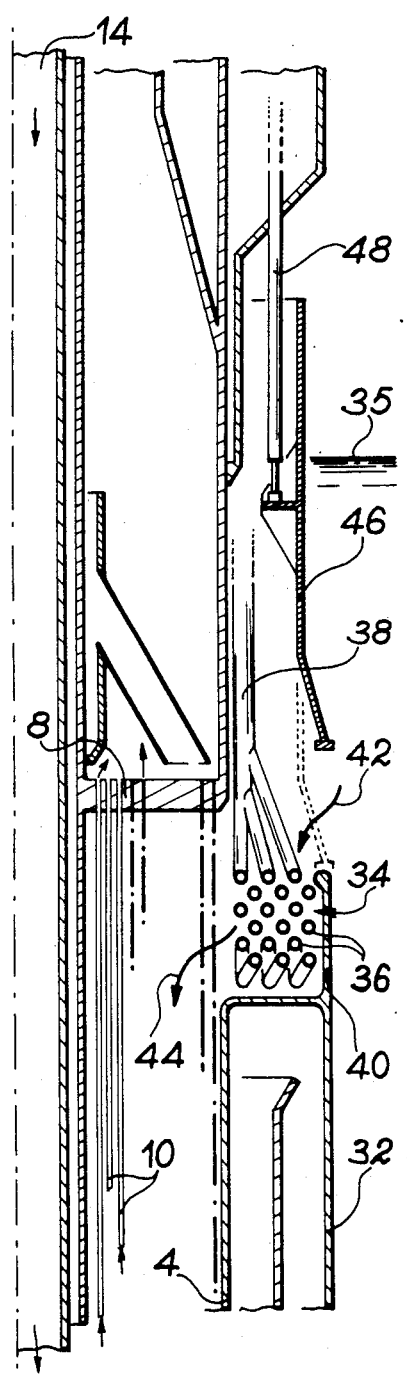

FIG. 6 shows a second embodiment of the exchanger according to the invention. In this case, the bundle of the auxiliary cooling device is placed at the bottom of the exchanger inlet window 20. During the normal operation of the reactor, the pressure drop is lower than in the case of the construction of FIG. 5, but all the primary flow does not pass onto the bundle.

Figure 7:
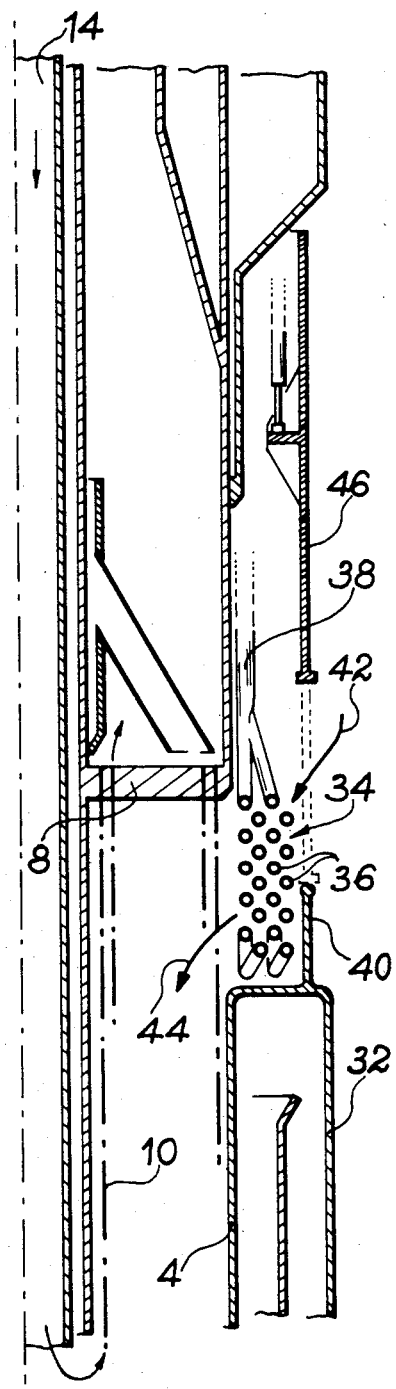

FIG. 7 shows a third embodiment of the exchanger according to the invention. In this case, the bundle of the auxiliary cooling device occupies the entire height of exchanger window 20. This makes it possible to reduce the pressure drop compared with the construction of FIG. 5. When removing all the residual power, all the primary sodium flow passes onto the bundle of the auxiliary cooling device.

Figure 8:
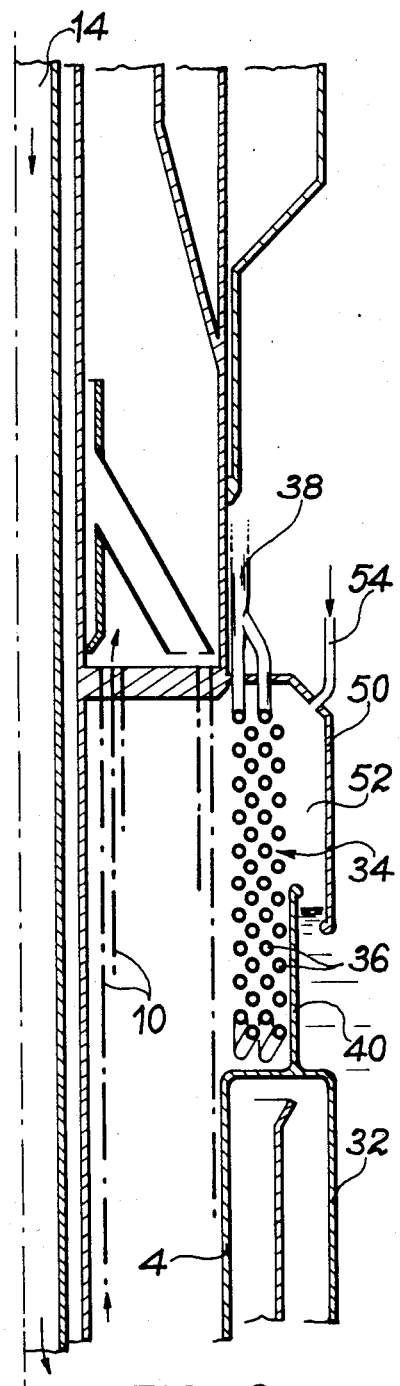

FIG. 8 shows a fourth embodiment of the exchanger according to the invention having a pneumatic sealing means 50 for window 20. This sealing means, which has the same function as device 46 in FIG. 5, is constituted by a bell-shaped member making it possible to trap an argon bubble 52. This gas is supplied by duct 54 connected to member 50.

The various embodiments of the heat exchanger, equipped with the auxiliary cooling device described hereinbefore, make it possible to reduce the reactor dimensions and costs. The solution recommended by French Pat. No. 2,374,609 already had this advantage, but as a result of the design and positioning of the bundle of hairpin-shaped tubes of the auxiliary cooling device according to the present invention, its efficiency in removing the residual power is greater and, in addition, there is no difficulty when working on the bundle of said device. Finally, its compact structure gives it a good resistance to vibrations and earthquakes.

What is claimed is:
1. A heat exchanger comprising:
   A. a vertical envelope having an inlet window and an outlet window for conducting a primary heat transfer medium through said envelope;
   B. heat transfer tubes mounted in said envelope and extending between said envelope windows;
   C. first and second fluid collectors in fluid communication with said tubes for conducting a secondary heat transfer medium through said tubes;
   D. a ferrule extending up from said envelope at said inlet window therein; and
   E. an auxiliary cooling device located within said ferrule and occupying substantially the entire width of said inlet window.
2. The heat exchanger defined in claim 1:
   A. wherein the auxiliary cooling device is constituted by a plurality of hairpin-shaped open-ended pipes positioned in said deflecting means around said tube bundle; and
   B. further including a heat transfer fluid circuit connected to the opposite ends of the said pipes.
3. The heat exchanger defined in claim 1 and further including an anti-vibration belt positioned in said envelope in supporting engagement with said tubes.

4. The heat exchanger defined in claim 3 wherein said belt comprises:
   A. a rigid frame; and
   B. an array of crossed bars havign opposite ends mounted to said frame so as to define spaces between said bars for grippingly receiving said tubes.
5. The heat exchanger defined in claim 1 wherein said auxiliary cooling device is located at the bottom of said inlet window.
6. The heat exchanger comprising:
   A. a vertical envelope having an inlet window and an outlet window for conducting a primary heat transfer medium through said envelope, said inlet window having appreciable vertical extent;
   B. a bundle of heat transfer tubes mounted in said envelope, corresponding first ends of said tubes being located adjacent to said inlet window and corresponding second ends of said tubes being located adjacent to said outlet window;
   C. first and second fluid collectors in fluid communication with said tube first and second ends respectively for conduction of a secondary heat transfer medium through said tubes;
   D. an axilliary cooling device positioned in said inlet window level with said first collector and surrounding said tube first ends; and
   E. fluid deflecting means projecting from said envelope at said inlet window therein and surrounding said cooling device.
7. The heat exchanger comprising:
   A. a vertical envelope having an inlet window and an outlet window for conducting a primary heat transfer medium through said envelope, said inlet window having appreciable vertical extent;
   B. a bundle of heat transfer tubes mounted in said envelope, corresponding first ends of said tubes being located adjacent to said inlet window and corresponding second ends of said tubes being located adjacent to said outlet window;
   C. first and second fluid collectors in fluid communication with said tube first and second ends respectively for conduction of a secondary heat transfer medium through said tubes;
   D. an axilliary cooling device positioned in said inlet window occupying the entire height thereof and surrounding said tube first ends; and
   E. fluid deflecting means projecting from said envelope at said inlet window therein and surrounding said cooling device.
8. The heat exchanger comprising:
   A. a vertical envelope having an inlet window and an outlet window for conducting a primary heat transfer medium through said envelope, said inlet window having appreciable vertical extent;
   B. a bundle of heat transfer tubes being located adjacent to said inle window and corresponding second ends of said tubes being located adjacent to said outlet window;
   C. first and second fluid collectors in fluid communication with said tube first and second ends respectively for condition of a secondary heat transfer medium through said tubes;
   D. an axilliary cooling device positioned in said inlet window and surrounding said tube first ends;
   E. fluid deflecting means projecting from said envelope at said inlet window therein and surrounding said cooling device; and
   F. sealing means for closing said inlet window into said envelope to block the conduction of said primary heat transfer medium into said envelope.

* * * * *